E. C. DE SMET.
COLLAPSIBLE FOOTREST.
APPLICATION FILED APR. 7, 1919.

1,327,706.

Patented Jan. 13, 1920.

UNITED STATES PATENT OFFICE.

EDGARD C. DE SMET, OF ST. CLOUD, MINNESOTA, ASSIGNOR TO SAMUEL C. PANDOLFO, OF ST. CLOUD, MINNESOTA.

COLLAPSIBLE FOOTREST.

1,327,706.	Specification of Letters Patent.	Patented Jan. 13, 1920.

Application filed April 7, 1919. Serial No. 288,129.

*To all whom it may concern:*

Be it known that I, EDGARD C. DE SMET, a subject of the Kingdom of Belgium, and a resident of St. Cloud, in the county of Stearns and State of Minnesota, have invented certain new and useful Improvements in Collapsible Footrests, of which the following is a description, reference being had to the accompanying drawing, which forms a part of my specification.

My invention relates to a collapsible footrest or support more especially intended for use in connection with automobiles of the type wherein the front seat back is adapted to be swung into a reclining position and in conjunction with the rear seat form a couch, when the rest or support is intended to be brought into "set up" or supporting position forward of the front seat.

The object of my invention is to provide a rest or support which may be readily secured to the cross-rail or underframe of the front seat, namely to the front part of the underframe at a point beneath the cushion, and which is adapted to collapse or be folded into inoperative position beneath the front seat cushion when not in use; while at the same time it may be readily unfolded or opened out when the cushion is moved out of the way and will remain in "set up" position and be supported by the seat underframe.

While my improved construction is more especially intended as a foot-rest or support for use as above stated, the invention may be differently employed, as for example as an auxiliary seat, by simply securing it in place in a slightly different manner so that the unfolding of the rest or support will not interfere with the usual arrangement of the seats or cushions of the automobile.

The objects of my invention and its advantages will be more fully comprehended from the detailed description of the accompanying drawing, wherein:—

Figure 1:
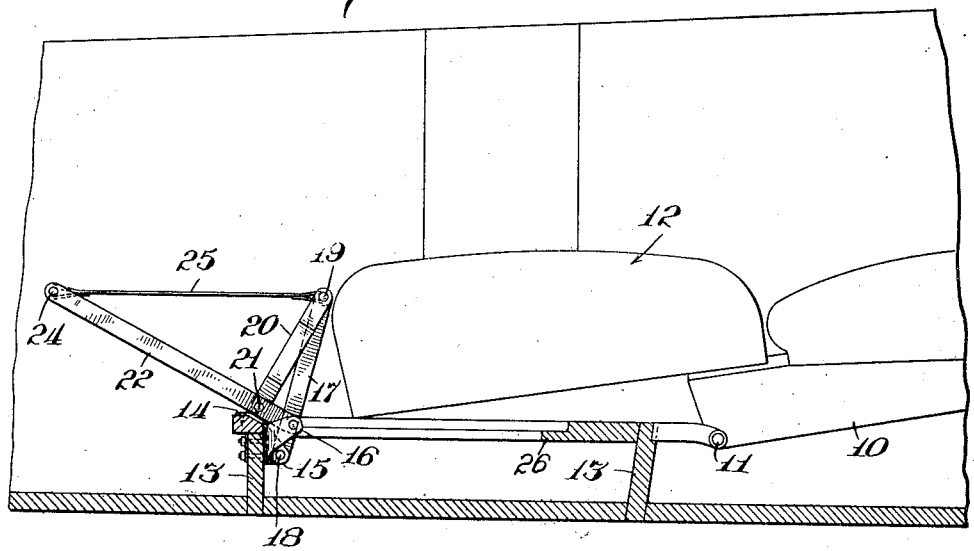
Figure 1 is a side elevation of my improved rest or support shown applied to the supporting rail or under-frame of the front seat or cushion of an automobile; the rest or support being shown in extended or unfolded position, while the cushion and front seat-back are shown arranged so as to constitute a couch.

As previously stated, my invention is more especially intended for use in an automobile wherein the front seat-back, shown at 10, is pivotally secured at 11 so as to permit it to be swung down into a horizontal or reclining position as shown, and thus enable the front seat cushion 12 to be moved back slightly beyond its supporting structure or underframe, shown at 13, whereby my improved rest or support may be brought up into unfolded or "set up" position as shown in full lines. In practice, the rest or support is of such construction and so secured to the front rail or underframe 13 of the front-seat as to bring the top of the rest or support substantially in the same horizontal plane as the top of the cushion or seat 12.

I believe the construction illustrated in the drawing to be the best embodiment and adaptation of my invention, but it is evident that the invention may have expression in somewhat different mechanical form without departing from the spirit of the invention as set forth in the appended claims.

Figure 2:
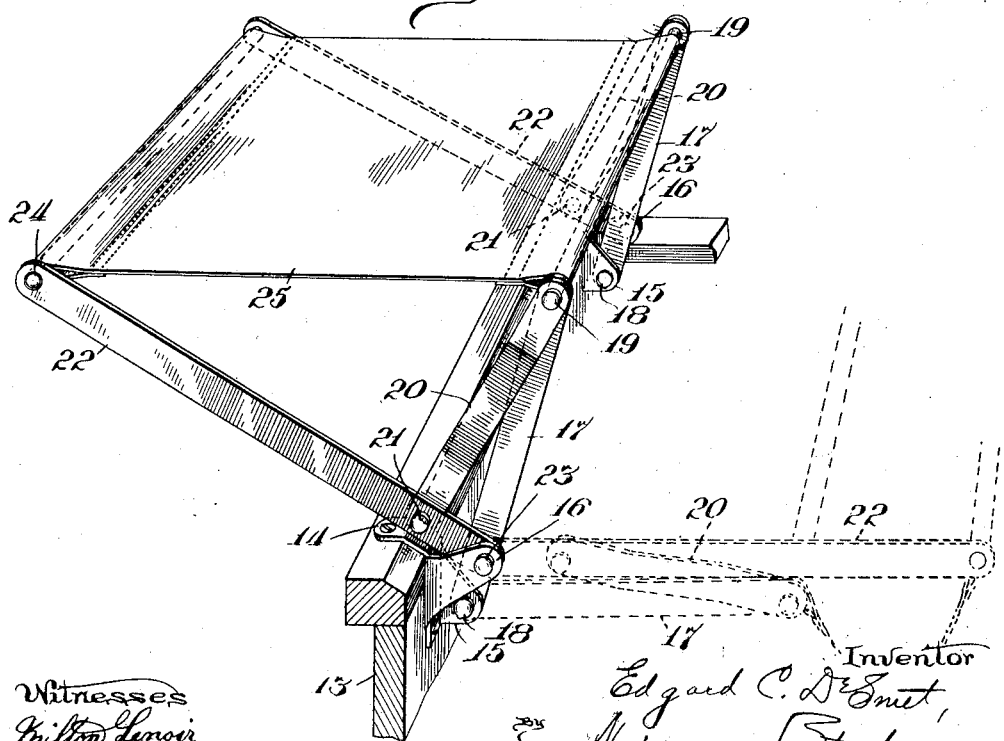
Fig. 2 is a perspective view of my inprovement on an enlarged scale, showing the rest secured to a supporting rail or underframe and in unfolded condition; the folded condition of the near side of the rest being shown in dotted lines.

In the specific embodiment, the invention comprises a pair of similar metallic brackets or castings 14 adapted to be secured to the underframe or rail 13 of the front seat, as very clearly shown in Fig. 2. Each bracket or casting 14 is provided with a pair of ears or lobes 15 and 16 arranged in spaced relation and preferably disposed from opposite edges of the casting or bracket as shown; that is, with the lobe or ear 15 formed integral with one edge or side of the casting or bracket 14 and arranged in a different horizontal and vertical plane from the lobe or ear 16 which is formed integral with the opposite edge or side of the casting or bracket 14. The lobe or ear 16 of each casting or bracket 14 is preferably disposed in an upwardly inclining direction and given slightly greater length than the lobe or ear 15 of each bracket, thus causing the lobes or ears 16 to extend into vertical planes farther removed from the main or body portion of the brackets and therefore slightly farther from the cross-rail or underframe 13 than lobes or ears 15.

Each lobe or ear 15 has a link 17 pivotally secured thereto at 18 so as to permit vertical movement; the links 17 being of predetermined length and secured together at their upper or free ends by means of a rod 19. Pivotally secured on both ends of the rod 19, which extends transversely of the rest and to the outside of links 17, are the links 20 (one on each side of the foot-rest or support). The lower end of each link 20 is pivotally secured at 21 to a link 22 on the same side of the rest. The links 22 on each side of the foot-rest or support have their lower ends pivotally secured at 23 to their respective ears or lobes 16, while the outer or free ends are connected together by means of a suitable rod 24 disposed transversely of the foot-rest; the ends of the rod being swaged or otherwise secured in place against removal. The rods 19 and 24 provide attaching and supporting members for a suitable fabric or flexible material 25; the ends whereof are shown passed about the rods 19 and 24 and stitched or otherwise secured in place; the fabric being of such length as to be absolutely taut, as shown in the drawing, when the foot-rest or support is unfolded or in "set-up" position.

The lobes or ears 15 and 16 are formed on the brackets or castings so as to be located beneath the horizontal plane of the top of the supporting frame or rail 13, so that when the foot-rest is opened out, the links 22 may bear on or rest against the upper portion of the casting which is disposed about the beveled portion of the cross-rail or frame 13, as clearly shown, and thereby support the foot-rest in position somewhat forward of the seat underframe. The links 20 are pivotally secured to the links 22 at a distance slightly forward of the pivotal connection of links 22 with brackets 14, namely preferably at a point coincident with the points where links 22 bear or rest on the castings or brackets 14; and as the links 17 and 22 are somewhat spaced apart by reason of the relation between lobes or ears 15 and 16 to which they are respectively secured, the links 20 are given a slight curvature or bend as disclosed in the drawing in order to permit links 20 to have free pivotal relation with both links 17 and 22. The pivotal point 23 of link 22 is disposed slightly rearward of the plane of pivotal point 18 of link 17; so that any collapsing movement or tendency of the links will be prevented when downward pressure is exerted on the fabric 25, because of the location of the pivotal points 23 slightly rearward of the longitudinal center line or axis of each link 17, that is to say, rearward of the base of a triangle formed by pivotal points 18, 21 and the end of rod 19. With my improved construction, it has been found in practice that the fabric 25 becomes slightly more taut or stretched beyond normal at a moment just prior to the respective links assuming their maximum unfolded relation.

The device or support may be readily brought into supporting or unfolded position by simply grasping the connecting rod 24 and causing the links 22 to swing upward from the position shown in dotted lines in Fig. 2 through the arc of a circle into the position shown in full lines. Such upward pull on the rod 24 and links 22 will cause the links 17 and 20 to assume the relative positions disclosed in full lines, while links 22 may rest on the cross-rail or brackets secured thereto. On the other hand, the rest or support may be quickly collapsed or swung downwardly beneath the front seat cushion into the position shown in dotted lines in Fig. 2 by sufficient upward pressure on rod 24 which will cause the entire support, momentarily to swing about the pivotal points 18 and 23 until the pivotal points 23 are disposed in a position forward of the links 17, or at least forward of the longitudinal axis of links 17, when the device will readily collapse into the folded position shown in dotted lines.

In the particular exemplification of the invention, I have, for convenience and expense in manufacture, shown the links 20 pivoted on the ends of the rod 19; it will be understood, however, that the pivotal connections of links 20 with links 17 need not be at the points shown, especially where the relation between the elements of the foot rest are somewhat altered; but the pivotal points for links 20 at their upper ends (when the rest is opened out) will in most instances be located at the longitudinal center lines of links 17, but possibly removed from the ends of rod 19.

The supporting frames for the seat of automobiles, at least for the front seats of automobiles, are usually so formed as to provide a space or chamber beneath the seat proper, as shown in Fig. 1, and provided with a top panel 26 which may be cut away or kerfed, as shown in Fig. 1 to receive the rod 24 and prevent the rest or support from swinging down onto the floor of the automobile body and thus at the same time provide space therebeneath for other usage.

Having shown and described what I believe to be the best embodiment of my invention, what I claim is:—

1. A foot-rest of the class described, comprising in combination with a supporting element, a pair of parallel links pivotally secured at their lower ends to said supporting element and in spaced relation, a connecting member or rod intermediate of the upper or free ends of said links, a pair of parallel links pivotally secured to said supporting element at points slightly rearward of the vertical plane of the pivotal points of said first mentioned links on said supporting element and in a different horizontal plane, the free ends of said last mentioned pair of parallel links being secured together by a connecting rod or member, flexible material disposed intermediate of the connecting rods or members of the two pair of links and secured thereto, and a third pair of links pivotally secured at one end of each link to the first mentioned pair of links and pivotally secured at their other ends to said second pair of links at a point forward of the pivotal connections of said second pair of links with said supporting element.

2. A foot-rest of the class described, comprising supporting brackets or members adapted to be secured to the cross-rail or supporting frame of an automobile seat, said brackets being provided with lobes or ears arranged in spaced relation and disposed in different horizontal planes and of different length, a pair of parallel links pivotally secured at one of the ends thereof to one of said lobes or ears of each bracket or member, while the outer ends of said links are secured together by a connecting member or rod, a second pair of links, each of which is pivotally secured at its one end to the other lobe or ear of its respective bracket or member, with the outer ends of said second pair of links secured together by means of a connecting rod, fabric secured at its ends to the connecting rods of both pairs of links so as to be in taut condition when said foot-rest is unfolded, and a third pair of links, each of which is pivotally secured at one end to the ends of the connecting rod of the first pair of links, while the other end of each link of said third pair is pivotally secured to the respective links of said second pair at a point intermediate of the ends of the link of said second pair so as to be disposed in a direction forward of the vertical plane occupied by the ends secured to the connecting rod of the first mentioned pair of links when the rest is in unfolded position.

3. A foot-rest of the class described, comprising three pairs of links, the one pair being pivotally secured at one of the ends to a supporting element, while the opposite ends of said pair are connected together by a cross-bar or rod, the second pair of links being pivotally secured at one of the ends to said supporting element but in a different horizontal and vertical plane from that of the pivotal points for said first mentioned pair, while the other ends of said second pair of links are connected together by a cross-rod or bar, the third pair of links being pivotally secured at their ends to the connecting bar or rod of the first mentioned links and to the second pair of links but at points forward of the pivotal connection of the first mentioned pair of links on the supporting element, and flexible material or fabric secured at its ends to said connecting rods or cross-bars so as to be in taut condition when said links are in "set-up" or folded-out position.

4. A foot-rest of the class described, comprising, in combination with a supporting frame, a pair of parallel members pivotally secured at one of their ends to said frame in spaced relation, while the other ends are secured together, a second pair of parallel members, of greater length than the first members, secured together at their outer ends with the other ends pivotally secured to said frame at points slightly rearward of the vertical plane of the pivotal points of the first members, flexible material secured to the upper portions of both pair of members adapted to constitute the top of the rest, and a third pair of members or links pivotally secured at one of the ends of each link to the respective members of said first pair, while the other ends of said third pair of links are pivotally secured to the second pair of members at points forward of the pivotal connections of said second pair of members on the frame, when the rest is in the set-up condition.

5. A foot-rest of the class described, comprising two sets of links secured in place on a supporting frame in spaced relation, each set consisting of three links, with two links of each set pivotally secured to the frame but in different horizontal and vertical planes, while the third link of each set is pivotally secured at one end to the first mentioned links and pivotally secured at the other end to the other of said first mentioned links at a point forward of the pivotal connection of said first mentioned link on the supporting frame, and flexible material secured to the tops of the first mentioned links of both sets to form the top when the rest is in "set-up" condition.

6. A foot-rest of the class described, comprising, in combination with a supporting frame, a frame element pivotally secured at its lower ends to said supporting frame, while the upper or free end is secured together by a transversely disposed portion, a second frame element, of greater length than the first mentioned element, pivotally secured at its lower end to said supporting frame at points disposed in a vertical plane rearward of the pivotal points of the first mentioned element, the outer or free ends of said second element being secured together by means of a transversely disposed portion, flexible material secured to the transversely disposed portions of both elements so as to form a top, and a member or link on each side of the foot rest, one end of each link being pivotally secured to the first-mentioned element, while the other end of each link is pivotally secured to the second mentioned element at a point forward of the pivotal connections of said second mentioned element on the supporting frame and forward of the pivotal connections of said links with the first mentioned element when the foot-rest is in "set-up" position.

EDGARD C. DE SMET.

Witnesses:
G. HEIDEMAN,
F. A. FLORELL.